(12) United States Patent
Abe et al.

(10) Patent No.: US 9,401,180 B2
(45) Date of Patent: Jul. 26, 2016

(54) HIGH RESOLUTION TAPE DIRECTORY (HRTD) STORED AT END OF DATA IN AN INDEX PARTITION

(71) Applicant: International Business Machines Corporation, Armonk, NY (US)

(72) Inventors: Atsushi Abe, Kanagawa-ken (JP);
Takashi Katagiri, Yokohama (JP);
Hirokazu Nakayama, Fujisawa (JP);
Yutaka Oishi, Kawasak (JP)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 13/651,207

(22) Filed: Oct. 12, 2012

(65) Prior Publication Data
US 2014/0108720 A1 Apr. 17, 2014

(51) Int. Cl.
*G06F 12/00* (2006.01)
*G11B 27/32* (2006.01)
*G11B 27/10* (2006.01)
*G06F 17/30* (2006.01)

(52) U.S. Cl.
CPC ........ *G11B 27/328* (2013.01); *G06F 17/30067* (2013.01); *G11B 27/107* (2013.01); *G11B 2220/93* (2013.01)

(58) Field of Classification Search
CPC ............... G11B 27/328; G11B 27/107; G11B 2220/93; G06F 17/30067
See application file for complete search history.

(56) References Cited

U.S. PATENT DOCUMENTS

| | | |
|---|---|---|
| 5,369,532 A | 11/1994 | Dodt et al. |
| 5,710,676 A | 1/1998 | Fry et al. |
| 6,049,848 A | 4/2000 | Yates et al. |
| 6,493,166 B1 | 12/2002 | Takayama |
| 6,779,080 B2 | 8/2004 | Basham et al. |
| 6,937,411 B2 | 8/2005 | Goodman et al. |
| 7,103,811 B2 | 9/2006 | Talagala et al. |
| 7,454,406 B2 | 11/2008 | Kaplan et al. |
| 8,099,758 B2 | 1/2012 | Schaefer et al. |
| 2006/0106891 A1 | 5/2006 | Mahar et al. |

(Continued)

FOREIGN PATENT DOCUMENTS

| | | |
|---|---|---|
| JP | 08/190779 | 7/1996 |
| JP | 2011/113605 | 9/2011 |

OTHER PUBLICATIONS

Final Office Action Summary from U.S. Appl. No. 12/732,158 dated Feb. 11, 2013.

(Continued)

*Primary Examiner* — Kalpit Parikh
(74) *Attorney, Agent, or Firm* — Zilka-Kotab, PC

(57) ABSTRACT

In one embodiment, a tape drive system includes a file system adapted for enabling sequential access to data on a tape medium, a file access controller adapted for managing the data, the file access controller including logic adapted for writing a file on the tape medium, logic adapted for writing a pointer of the written file in an index of the tape medium, wherein the pointer is managed by the file access controller, logic adapted for creating a high resolution tape directory (HRTD) including detailed location information of data on the tape medium, and logic adapted for storing the HRTD as part of end of data (EOD) of the index when a tape cartridge housing the tape medium is unloaded. Other systems, methods, and computer program products are described according to more embodiments.

17 Claims, 10 Drawing Sheets

(56) References Cited

U.S. PATENT DOCUMENTS

| | | | |
|---|---|---|---|
| 2007/0088754 | A1 | 4/2007 | Brannon et al. |
| 2011/0238716 | A1 | 9/2011 | Amir et al. |
| 2011/0238905 | A1 | 9/2011 | Amir et al. |
| 2011/0238906 | A1 | 9/2011 | Amir et al. |
| 2012/0054428 | A1* | 3/2012 | Butt et al. .................. 711/111 |

OTHER PUBLICATIONS

Non-Final Office Action from U.S. Appl. No. 12/732,158 dated Dec. 3, 2013.
Non-Final Office Action from U.S. Appl. No. 12/732,151 dated Jan. 17, 2014.
Examiner's Answer from U.S. Appl. No. 12/732,159 dated Dec. 18, 2013.
Jaquette, G. A., "LTO: A better format for mid-range tape," IBM Journal of Research and Development, vol. 47, No. 4, Jul. 2003, pp. 429-444.
Piernas et al., "DualFS: a new journaling file system without metadata duplication," Proceedings of the 16th international conference on Supercomputing, ICS 2002, Jun. 22-26, 2002, pp. 137-146.
Non-Final Office Action from U.S. Appl. No. 12/732,159 dated Jun. 5, 2014.
Final Office Action from U.S. Appl. No. 12/732,151 dated Jul. 31, 2014.
Final Office Action from U.S. Appl. No. 12/732,158 dated Jul. 18, 2014.
Final Office Action from U.S. Appl. No. 12/732,159 dated Nov. 6, 2012.
Final Office Action from U.S. Appl. No. 12/732,151 dated Nov. 8, 2012.
Langstedt, N., "Linux File Permissions," tuxfiles.org, Oct. 5, 2005, http://www.tuxfiles.org/linuxhelp/filepermissions.html.
"XML," Wikipedia, version as of Mar. 19, 2009, http://en.wikipedia.org/wiki/XML.
"Encryption," Wikipedia, version as of Mar. 1, 2009, http://en.wikipedia.org/wiki/Encryption.

* cited by examiner

HIGH RESOLUTION TAPE DIRECTORY (HRTD) STORED AT END OF DATA IN AN INDEX PARTITION

BACKGROUND

The present invention relates to tape-based data storage, and more particularly, this invention relates to a high resolution tape directory (HRTD) which is stored at end of data (EOD) in an index partition.

Linear Tape File System (LTFS) is a file system that is implemented by using a partitioning function of a tape drive. In LTFS, a tape is divided into a plurality of partitions. Conventionally, two partitions are established, but there is no limit as to the number of partitions possible. Information on a file system is stored in a partition referred to as the Index Partition (IP). Data, which is the contents of one or more files, is stored in a partition referred to as the Data Partition (DP).

One reason to partition LTFS is the sequential nature of tape-based media, e.g., data stored to a tape must be accessed sequentially, from beginning to end or vice versa. In the data format of a tape, the writing of data is permitted only once if it is to be stored into the same partition. Meanwhile, subsequent data will also be erased when data is written by starting from some midpoint in the data.

When an update to a file is to be written to tape-based media, it is necessary to update the file system information relating to the data stored to the tape. Because of the format characteristics of any sequential access device on which the tape may be accessed, it follows that such information will be written once at the last position of the tape.

If there is only one partition, pointer information of the file system is acquired from the last logical position of the tape at each time the cartridge (housing the tape) is loaded. In some cases, it takes time to acquire the file system information. A known technique for solving the above problem is, in order to access the pointer information of a file system at a high speed immediately after the loading of a cartridge, to prepare a dedicated partition and store the file pointer information in this partition. In this way, it is possible to access the file-system pointer information on the tape at a high speed immediately after the loading of the cartridge.

One principal use of a conventional linear tape open (LTO) tape drive is for backup purposes. For example, when data written to the tape is read out, the necessity of randomly moving to (locating) data on the tape, such as sequentially transferring it from a certain specified location to the host, has been limited. The necessity of high-speed movement (locating) has been recognized in use in an Enterprise environment, such as a high performance storage system (HPSS), a virtual tape system (VTS), and/or a hierarchical storage management (HSM). In such use, a drive that has the ability to utilize the high resolution tape directory (HRTD) function in order to access a specified data location at a high speed, for example, IBM tape drive model TS1130/TS1140, is useful.

Tape directory (TD) is information that indicates, in detail, a location of data on a tape. This information is stored at a specified area on the tape, written at the time of cartridge unloading, and read out at the time of cartridge loading. The tape drive searches for the data through the tape on the basis of this location information. In standard LTO, this information is obtained by bisecting a tape in a longitudinal direction (which is referred to as TD) and is stored in a cartridge memory (CM), whereas in IBM tape drive model TS1130/TS1140, 64-divided detailed information sections (which is referred to as HRTD) are stored on the tape. Making more detailed location information available results in greater accuracy for determining the location of data stored on the tape, and also results in less time that is required to find the data on the tape. Therefore, the speed of accessing the data increases, which is beneficial to the art of data storage.

However, conventional LTO drives do not offer HRTD. Some reasons why it is not offered may include that the amount of HRTD information is too large to be stored in CM (which is only 8 KB), if a tape drive is in conformity to IBM's original format, such as TS1130/TS1140; and moreover, since LTO is an open standard, a storage location at a specified area on the tape is not defined therein. Also, the HRTD function is not as important if a tape drive is used primarily for backup purposes, as most tape drives typically are. In backup applications, the amount of time necessary to read data from a tape may not be the most important factor in choosing the tape storage over other methods and media.

However, in an LTO5 drive, which is a major use environment of the current linear tape file system (LTFS), a user may be able to read/write data on a tape, as well as data stored in other media formats, such as on a CD-R and/or a universal serial bus (USB) memory stick, via simple graphical user interface (GUI), such as drag and drop or by conducting command-line operation. For this reason, conventionally, time taken for accessing an arbitrary file on the tape is becoming more and more important in an LTO drive, as well as in other tape formats.

However, unlike the IBM tape drive model TS1130/TS1140, an LTO drive does not offer the HRTD function of pinpointing a data-read location at a high speed immediately after loading.

SUMMARY

In one embodiment, a tape drive system includes a file system adapted for enabling sequential access to data on a tape medium, a file access controller adapted for managing the data, the file access controller including logic adapted for writing a file on the tape medium, logic adapted for writing a pointer of the written file in an index of the tape medium, wherein the pointer is managed by the file access controller, logic adapted for creating a HRTD including detailed location information of data on the tape medium, and logic adapted for storing the HRTD as part of end of data (EOD) of the index when a tape cartridge housing the tape medium is unloaded.

In another embodiment, a method for managing detailed location information includes writing a file into a data partition of a tape medium, wherein the tape medium has two or more partitions including the data partition and an index partition, writing a pointer of the written file in the index partition of the tape medium, creating a HRTD, the HRTD including detailed location information of data in the data partition of the tape medium, and storing the HRTD as part of EOD of the index partition when a tape cartridge housing the tape medium is unloaded.

According to another embodiment, a computer program product for managing detailed location information includes a computer readable storage medium having computer readable program code embodied therewith, the computer readable program code including computer readable program code configured for writing a file into a data partition of a tape medium, wherein the tape medium has two or more partitions including the data partition and an index partition, computer readable program code configured for writing a pointer of the written file in the index partition of the tape medium, computer readable program code configured for creating a HRTD, the HRTD including detailed location information of data in the data partition of the tape medium, and computer readable program code configured for storing the HRTD as part of EOD of the index partition when a tape cartridge housing the tape medium is unloaded.

Other aspects and embodiments of the present invention will become apparent from the following detailed description, which, when taken in conjunction with the drawings, illustrate by way of example the principles of the invention.

DETAILED DESCRIPTION

Figure 1A:
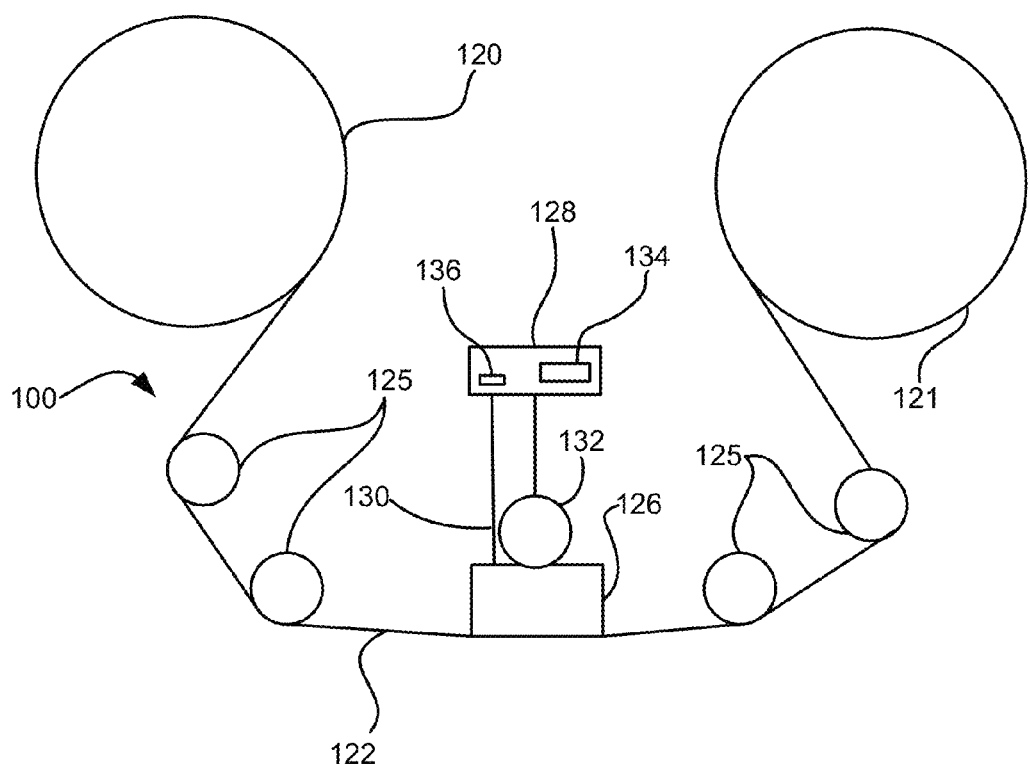
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

The following description discloses several preferred embodiments of magnetic storage systems, as well as operation and/or component parts thereof. Specifically, a method and systems capable of storing high resolution tape directory (HRTD) on a tape in a format conforming to the linear tape open (LTO) format are presented in order to achieve high-speed access to data stored on and via a LTO drive.

In one general embodiment, a tape drive system includes a file system adapted for enabling sequential access to data on a tape medium, a file access controller adapted for managing the data, the file access controller including logic adapted for writing a file on the tape medium, logic adapted for writing a pointer of the written file in an index of the tape medium, wherein the pointer is managed by the file access controller, logic adapted for creating a HRTD including detailed location information of data on the tape medium, and logic adapted for storing the HRTD as part of end of data (EOD) of the index when a tape cartridge housing the tape medium is unloaded.

In another general embodiment, a method for managing detailed location information includes writing a file into a data partition of a tape medium, wherein the tape medium has two or more partitions including the data partition and an index partition, writing a pointer of the written file in the index partition of the tape medium, creating a HRTD, the HRTD including detailed location information of data in the data partition of the tape medium, and storing the HRTD as part of EOD of the index partition when a tape cartridge housing the tape medium is unloaded.

According to another general embodiment, a computer program product for managing detailed location information includes a computer readable storage medium having computer readable program code embodied therewith, the computer readable program code including computer readable program code configured for writing a file into a data partition of a tape medium, wherein the tape medium has two or more partitions including the data partition and an index partition, computer readable program code configured for writing a pointer of the written file in the index partition of the tape medium, computer readable program code configured for creating a HRTD, the HRTD including detailed location information of data in the data partition of the tape medium, and computer readable program code configured for storing the HRTD as part of EOD of the index partition when a tape cartridge housing the tape medium is unloaded.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
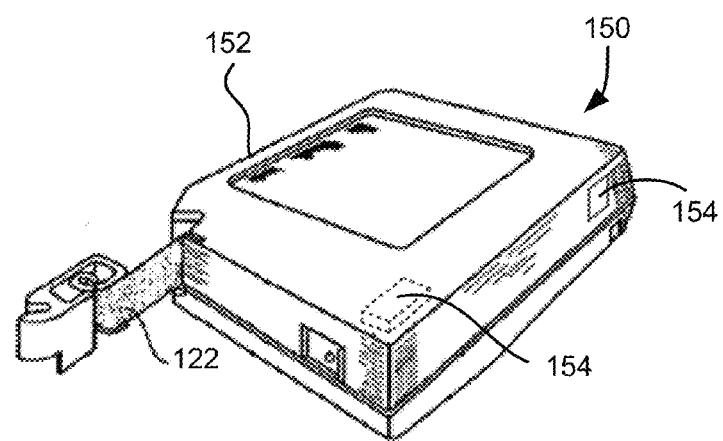
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 154 coupled to the housing 152. In some approaches, the nonvolatile memory 154 may be embedded inside the housing 152, as shown in FIG. 1B. In more approaches, the nonvolatile memory 154 may be attached to the inside or outside of the housing 152 without modification of the housing 152. For example, the nonvolatile memory may be embedded in a self-adhesive label. In one preferred embodiment, the nonvolatile memory 154 may be a Flash memory device, ROM device, etc., embedded into or coupled to the inside or outside of the tape cartridge 150. The nonvolatile memory is accessible by the tape drive and the tape operating software (the driver software), and/or other device, and is commonly referred to as cartridge memory (CM).

The proposed methods, according to various embodiments, produce great effects when used in combination with the linear tape file system (LTFS), and is based on a premise of Reading/Writing of a drive while building up HRTD information in a drive's memory. In fact, the performance of a tape drive improves when access to a file is made randomly on a LTO tape drive with LTFS (having multiple partitions). In one embodiment, the HRTD may be managed in conformity to the format of LTO to improve file-access performance in LTFS. Also, in one approach, HRTD may be stored as a part of special data referred to as end of data (EOD), the use of which is left to the discretion of each individual vendor, due to the protocol of the LTO format.

Also, when plural partitions exist (note that two or more logical compartments exist on a tape), judgment processing is performed to determine which one of the EODs that exist in the respective partitions is newer, thereby managing HRTD, which is a difference from conventionally used techniques.

More specifically, when HRTD is read from EOD, a validity check may be conducted in one approach to verify whether a standard tape directory (TD), which is a low resolution TD stored in cartridge memory (CM), matches with the HRTD or not.

Among HRTD read from EOD, HRTD of the other partition(s) (different from the partition that is read) is/are also made available for use. If it is in conformity to the multi-partition scheme, however, some sort of check may be utilized because there is a possibility that data of another partition might be rewritten after the writing of a certain EOD. To provide a solution to this situation, the validity check is conducted to verify whether standard TD matches with the HRTD or not.

For example, according to the LTO format specification, if the standard TD in a CM is broken, it is proper to perform TD recovery by using the TD of CM content read from EOD. However, this recovery method is available for the current partition only. It is impossible to recover the TD of the other partition(s) by using this recovery method. That is, in conventional tapes, TD that can be read from EOD and that can be used (irrespective of whether it is standard TD or HRTD) is limited to the EOD-written TD.

In principle, since the last-written EOD among all partitions could have TD of all partitions, it is possible to eliminate the need for the above HRTD validity check regardless of which one of the partitions is accessed for "write" by always rewriting the EOD of a specified partition and reading this EOD first immediately after the loading of a cartridge. To realize this advantage, however, the rewriting of the EOD of the partition, which has conventionally been unnecessary, has to be performed. Such rewriting should be avoided because it will have adverse effects on write performance of the tape drive. With some sort of validity check for putting HRTD to effective use, there is no need to worry about write performance. Thus, such a check is useful.

Figure 2:
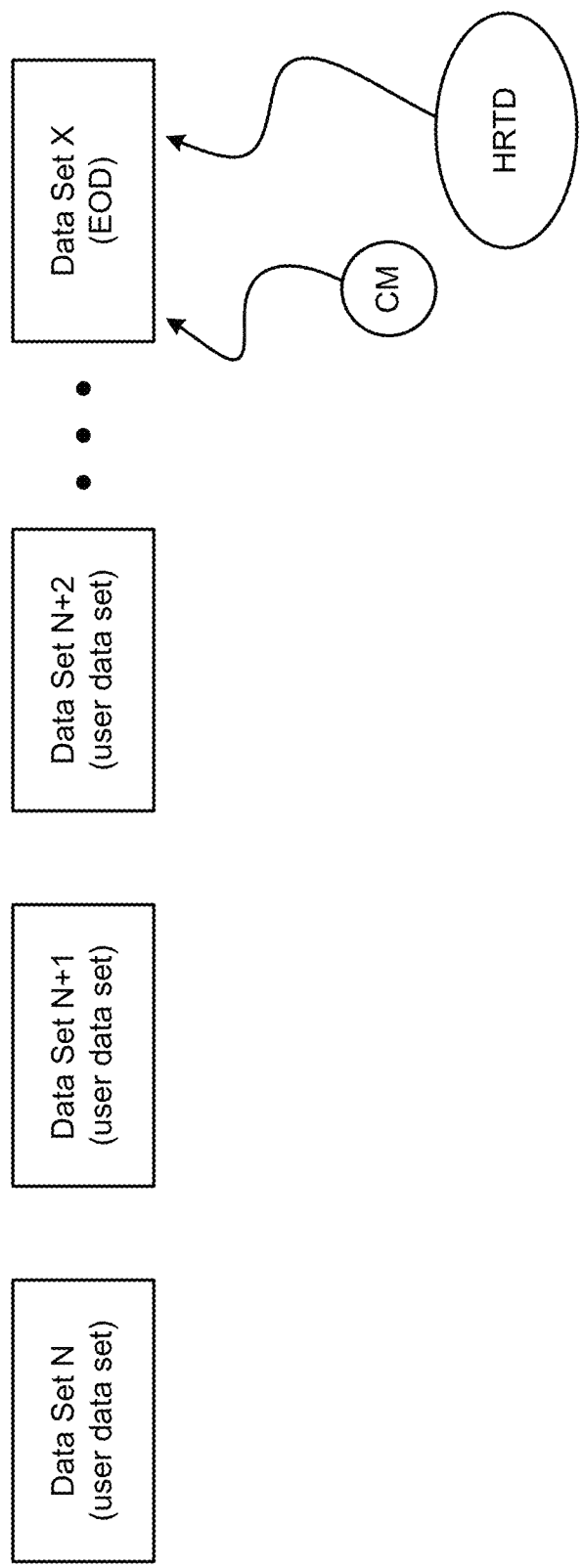
FIG. 2 shows location of end of data (EOD) in a file system according to one embodiment.

In addition, as shown in FIG. 2, the space in EOD to store the HRTD is just a vendor reserved area according to the LTO standard format. The EOD is positioned after all the data sets. The LTO format standard indicates that the CM data is stored in the first 8 KB, while the latter portion of the EOD is vendor specific space. The HRTD may be placed in this vendor specific area, in one embodiment. Other drive venders may write some data in this area for another use instead of HRTD. In this case, HRTD cannot be used without a validity check between the HRTD and the TD stored in the CM, since different data might be stored in this vender reserved area. This method may be applied to a single partition tape medium or to a multi-partition tape medium, which may include at least a data partition and an index partition, among others.

Figure 3:
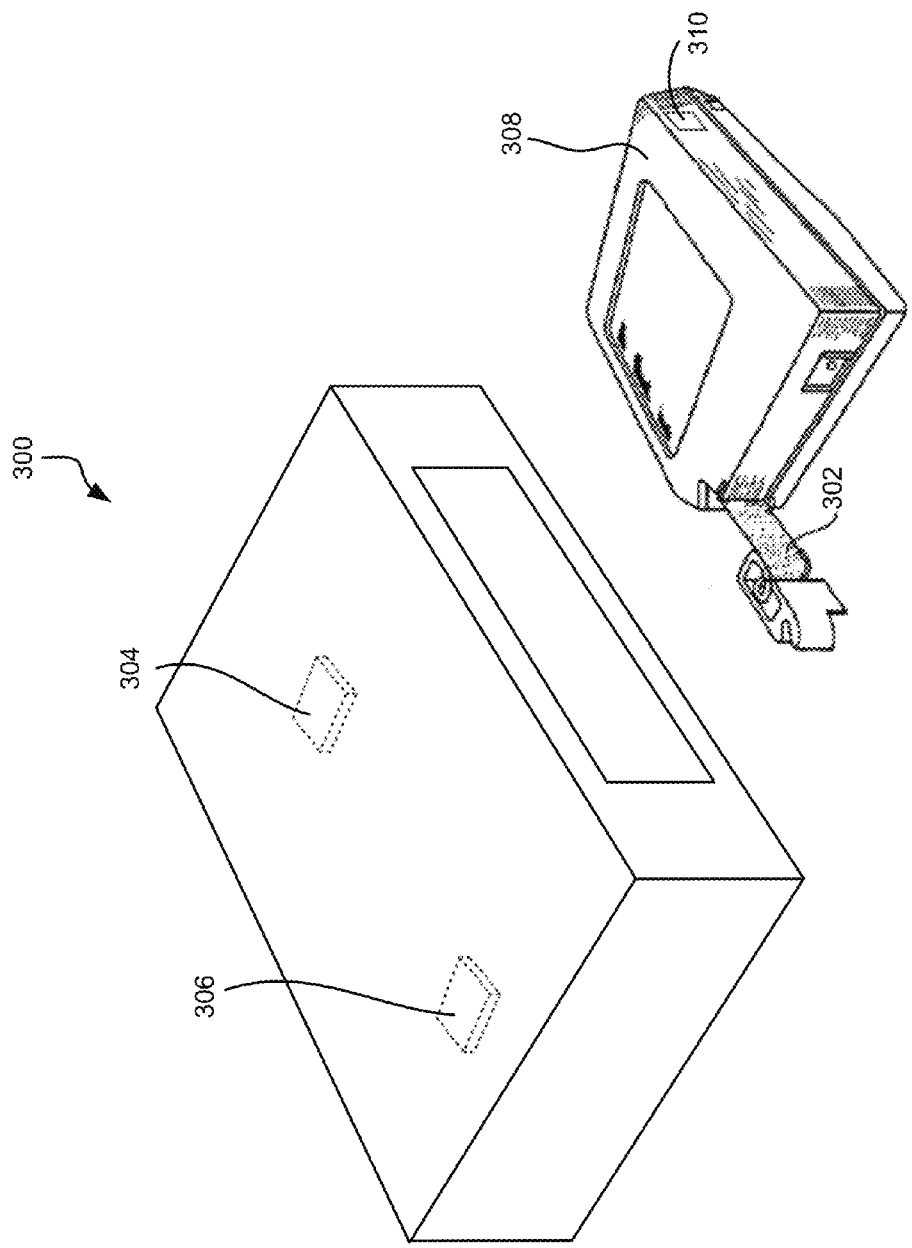
FIG. 3 shows a system according to one embodiment.

In one embodiment, as shown in FIG. 3, a tape drive system 300 comprises a file system (which may be enabled in a processor 306 in one embodiment) adapted for enabling sequential access to data on a tape medium 302, a file access controller 304 adapted for managing the data, the file access controller 304 comprising logic adapted for writing a file on the tape medium 302, logic adapted for writing a pointer of the written file in an index of the tape medium 302, wherein the pointer is managed by the file access controller 304, logic adapted for creating a HRTD including detailed location information of data on the tape medium 302, and logic adapted for storing the HRTD as part of EOD of the index when a tape cartridge 308 housing the tape medium 302 is unloaded.

In another embodiment, the tape drive system 300 may adhere to LTO format standards, and the file system may adhere to LTFS. In another embodiment, the tape drive system 300 may include logic adapted for receiving, via the file system, a request to read out a specified file, logic adapted for loading a tape cartridge 308 housing a tape medium 302 which includes the specified file stored thereon, logic adapted for reading out a pointer from the tape medium 302 to acquire directory information corresponding to a location of the specified file, and logic adapted for, concurrent to reading out the pointer, reading out the EOD from the index in order to acquire the HRTD.

In another approach, the tape drive system may further comprise logic adapted for determining whether a stored HRTD is valid, logic adapted for validating the acquired HRTD and requesting access to the specified file according to the detailed location information of the HRTD corresponding to the specified file when the stored HRTD is valid, logic adapted for using standard tape directory (STD) stored in CM 310 to access location information of the specified file when the stored HRTD is invalid, and logic adapted for accessing the specified file at a higher speed when using the HRTD or at a lower speed when using the STD.

In yet another embodiment, the tape drive system may further comprise logic adapted for making changes to data stored in a first portion of the tape medium 302, logic adapted for storing detailed location data for the changed data to EOD of the first portion of the tape medium 302, and logic adapted for reflecting the detailed location data for the changed data in the HRTD stored to the EOD of the index when the tape cartridge 308 housing the tape medium 302 is unloaded.

According to another embodiment, the logic adapted for storing the HRTD as part of the EOD of the index may comprise logic adapted for requesting movement of the tape medium 302 to the index in order to update the index after changes have occurred to data on the tape medium 302, logic adapted for writing an updated index, logic adapted for, concurrent to writing the updated index, writing an updated HRTD into the EOD of the index, and logic adapted for requesting for the tape cartridge 308 to be unloaded.

In one approach, the tape drive system 300 may include logic adapted for partitioning the tape medium 302 into two or more partitions, the two or more partitions including at least a data partition and an index partition, wherein the index is stored to the index partition, and wherein data is stored to the data partition.

Figure 4:
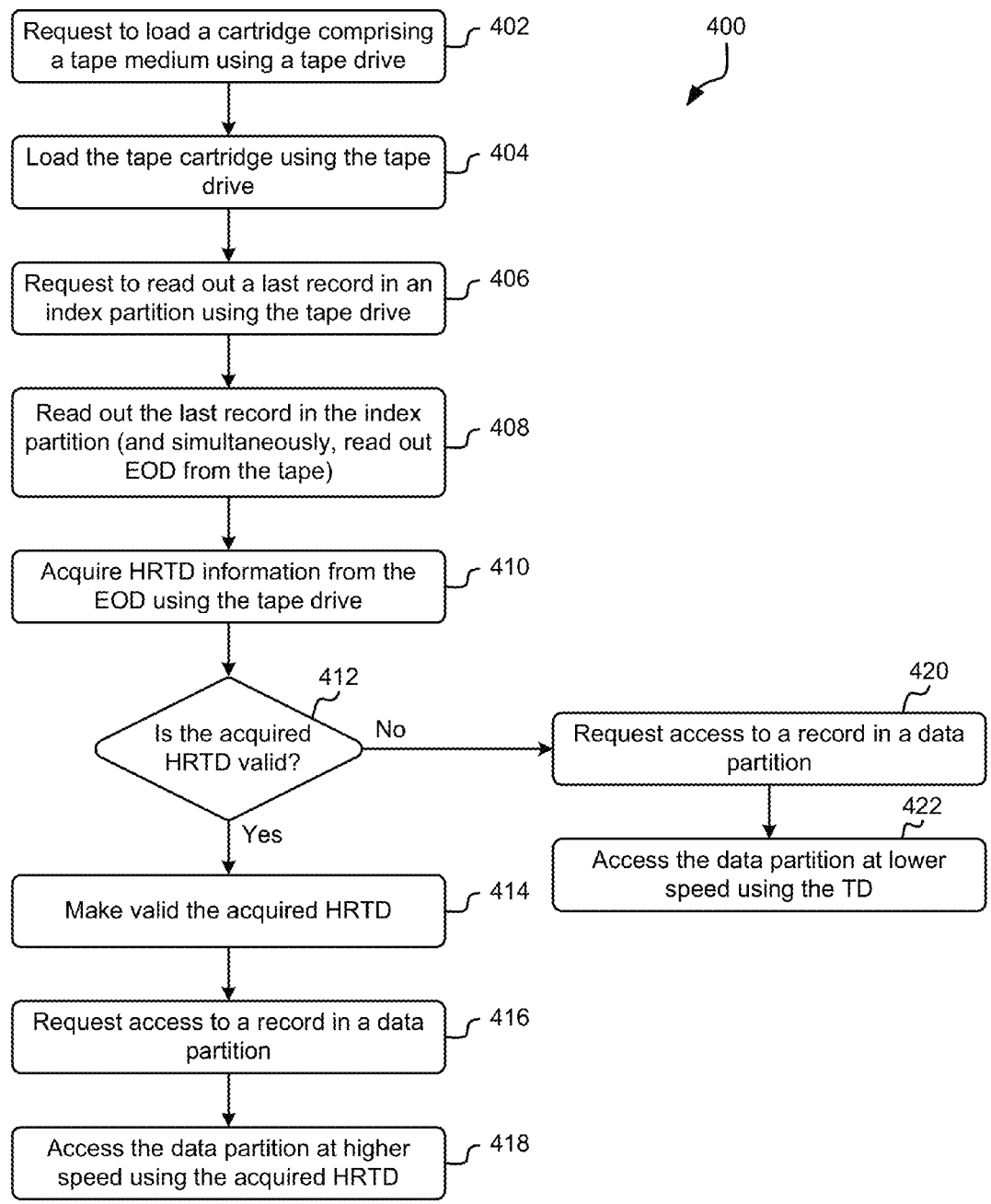
FIG. 4 shows a flowchart of a method, according to one embodiment.

Now referring to FIG. 4, a flowchart of a method 400 for loading a tape cartridge is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions. Each of the steps of the method 400 may be performed by any suitable component of the operating environment, such as by using the LTFS.

Since an application (specifically, LTFS) that behaves as illustrated in FIG. 4 requests it, adding/storing the HRTD to/in the EOD of the index partition and using the HRTD is useful for improving the performance of data access in a tape drive, in various embodiments.

In operation 402, a drive is requested to load a tape cartridge comprising a tape medium. This request may be sent by LTFS, in one embodiment, or any application capable of sending such a request.

In operation 404, the tape cartridge is loaded. A tape drive most likely loads the tape cartridge, as it is adapted to do so.

In operation 406, a request is issued to read out a last record in an index partition using the tape drive. In one embodiment, this request may be sent by LTFS, or any application capable of sending such a request.

In operation 408, the last record in the index partition is read out using the tape drive and therefore, simultaneously, the EOD is read out from the tape using the application (LTFS). In this operation, file pointer information (the index file) that is stored near the EOD of the index partition is read out immediately or as soon as possible after the loading of the tape cartridge.

In operation 410, the HRTD information is acquired from the EOD using the tape drive. According to one embodiment, the EOD of the index partition may always be read before access to a data partition.

In operation 412, it is determined if a stored HRTD is valid. If so, method 400 continues to operation 414; otherwise, method 400 continues on to operation 420.

When the stored HRTD is valid, in operation 414, the acquired HRTD is made valid, so that it may be used. Then, in operation 416, access to a record in the data partition is requested, such as by using the LTFS, and in operation 418, the data partition is accessed at higher speed with the tape drive using the acquired HRTD.

When the stored HRTD is not valid, in operation 420, access is requested, using the LTFS, to a record in the data partition. Then, in operation 422, the data partition is accessed at lower speed with the tape drive using the standard TD.

Method 400 may be used for storing the HRTD on a tape in a format conforming to the LTO format standard, according to one embodiment. Specifically, in this embodiment, the LTFS reads file pointer information (referred to as an index file) that is stored near EOD of the index partition immediately after the loading of a cartridge. The EOD of the index partition is always read before access to the data partition is performed. The LTFS updates the file pointer information that is stored near the EOD of the index partition immediately before the unloading of a cartridge. After updating the data of the data partition, the data is written once in the index partition. Since the EOD is overwritten at this moment, it is possible to store the latest HRTD on the tape at this moment as well with little additional effort or time. Accordingly, the HRTD is stored as a part of special data (the last tag data in each partition) in the EOD, the use of which is left to the discretion of each individual vendor, due to the standards of the LTO format.

Since the HRTD is stored in the EOD, it is not possible to use the HRTD until the EOD is read out. The fact that the HRTD does not become valid until the EOD is read causes data access to be delayed until the HRTD is acquired by reading the EOD. However, in LTO, this approach has not been implemented because, conventionally, there are significant disadvantages in reading the EOD before data access.

As far as LTFS goes, however, there exists behavior that is unique to LTFS at the time of loading or unloading of a cartridge.

According to some approaches, the LTFS may update file pointer information (the index file) that is stored near the EOD of the index partition immediately before the unloading of the tape cartridge also. Then, after updating the data of the data partition, the pointer data may be written once in the index partition. Since the EOD is overwritten at this moment, it is possible to store the latest HRTD on the tape.

Furthermore, the HRTD that is read from the EOD that exists in a certain partition (the index partition) includes information on the other partition (the data partition). For this reason, it is possible to achieve movement (locating) at a high speed when accessing the data partition immediately after reading the index partition using the HRTD.

Also, even if the EOD that exists in a certain partition includes the HRTD of another partition, this HRTD is not necessarily the latest HRTD, which is excluded from consideration. This is because the EOD of each partition is updated independently of the other(s), and therefore some EODs may not include the latest information about other partitions.

Therefore, it is good practice to conduct a validity check for, among HRTD read from the EOD, HRTD of the other partition(s).

Figure 5:
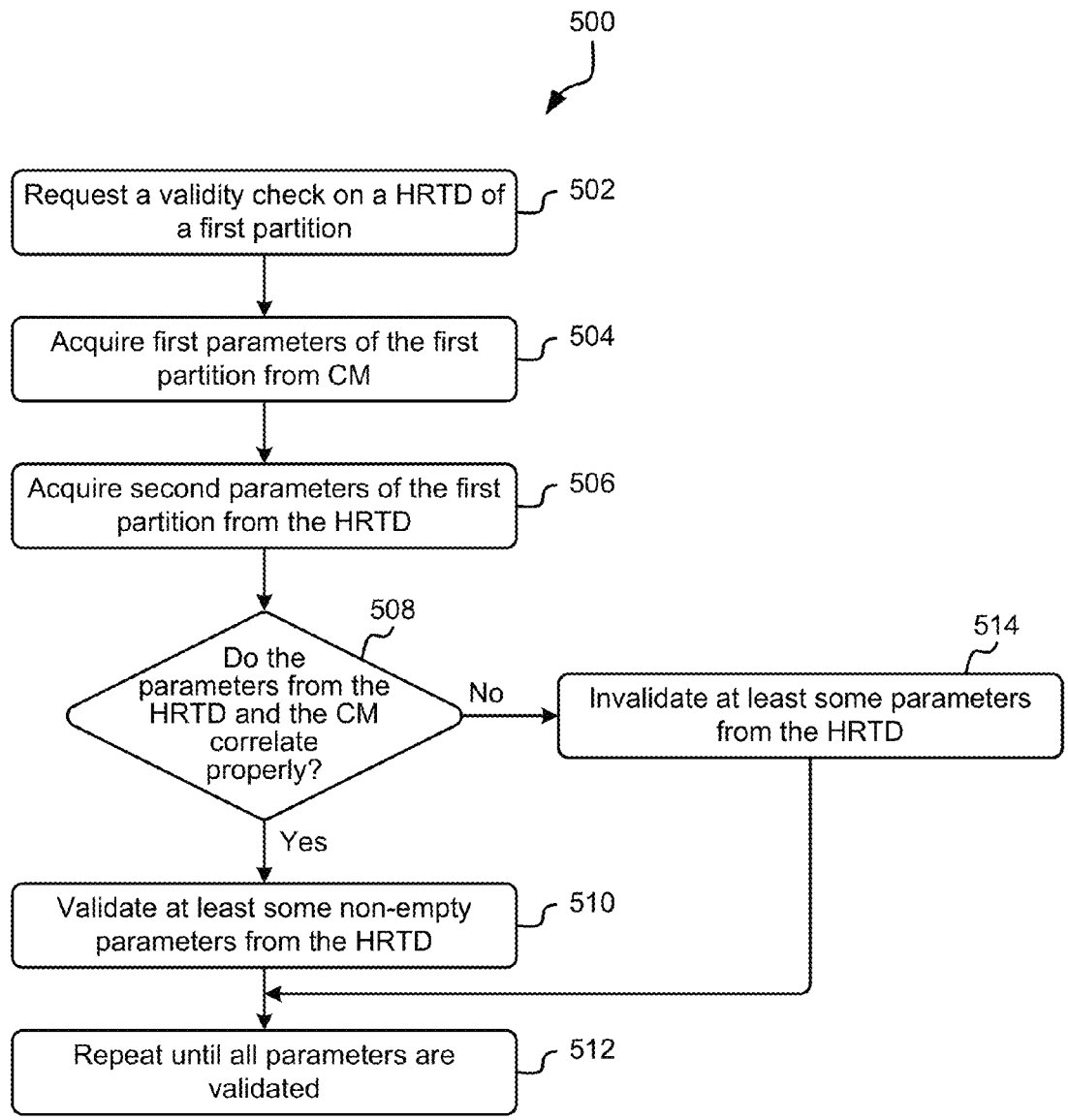
FIG. 5 shows a flowchart of a method, according to one embodiment.

Now referring to FIG. 5, a flowchart of a method 500 for validating the acquired HRTD is shown according to one embodiment. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions. Each of the steps of the method 500 may be performed by any suitable component of the operating environment.

In operation 502, a validity check is requested to be performed on a HRTD of a first partition.

In operation 504, first parameters are acquired of the first partition from cartridge memory (CM). Any applicable parameters may be acquired, such as a maximum write pass (WP) and a maximum DS (number) included in a range up to an "$i^{th}$" region, where the $i^{th}$ region denotes an ordinal number "i," which is referred to herein as standard tape directory parameters, or STD for short. The DS number is assigned from the head of a tape for each unit of data written into the tape (by starting from zero). The WP indicates which one is newer for the same DS number when data is overwritten. For the same DS, one with a greater WP value is newer (the latest). Another parameter which may be acquired is an index of the region in which the EOD exists, which is referred to as "x."

In operation 506, second parameters are acquired of the first partition from the HRTD. Any applicable parameters may be acquired which may be compared to the first parameters, such as a maximum WP and a maximum DS (number) included in a range up to the $i^{th}$ region. Another parameter which may be acquired is an index of the region in which the EOD exists, which is referred to as "y."

In operation 508, it is determined if the first and second parameters (from the CM and the HRTD, respectively) correlate properly. In one embodiment, it may be determined if $STD(x)=HRTD(y)$ and $STD(x-1)=HRTD((Y/X)*x)$. X is the number of regions of the wrap in STD, while Y is the number of regions of the wrap in HRTD. If these equations are true, then it is determined that the parameters do correlate properly; otherwise, they do not.

In operation 510, when the parameters correlate properly, at least some non-empty parameters from the HRTD are validated. In one embodiment, this may be performed by choosing among the HRTD(j) included in the STD(x), those parameters which are not empty are made to be valid. In this embodiment, the range of j is: $((Y/X)*x) < j \leq y$.

Then, i is set to x−1, and it is determined if $STD(i)=HRTD((i+1)*Y/X-1)$ and $STD(i-1)=HRTD(i*Y/X-1)$. If so, then among the HRTD(j) included in the STD(i), those parameters which are not empty are made to be valid. The range of j is: $((X/Y)*i) \leq j \leq X/Y*(i+1)$. After this is performed, it is determined if i is 0, if so, the method 500 ends. Otherwise, i is decremented and it is determined again if $STD(i)=HRTD((i+1)*Y/X-1)$ and $STD(i-1)=HRTD(i*Y/X-1)$. Should at any time these relationships not be true, then the HRTD(j) included in STD(i) are made invalid, where the range of j is: $((X/Y)*i) \leq j \leq X/Y*(i+1)$.

In operation 514, when the parameters do not correlate properly, at least some parameters from the HRTD are invalidated. In one embodiment, this may include invalidating the HRTD(j) included in STD(x), where the range of j is $((Y/X)*x) < j \leq y$. When the parameters from the HRTD are invalidated, the corresponding parameters from the STD are used in their place.

In operation 512, at least operations 508, 510, 514 of method 500 is repeated until all parameters are validated.

Figure 7:
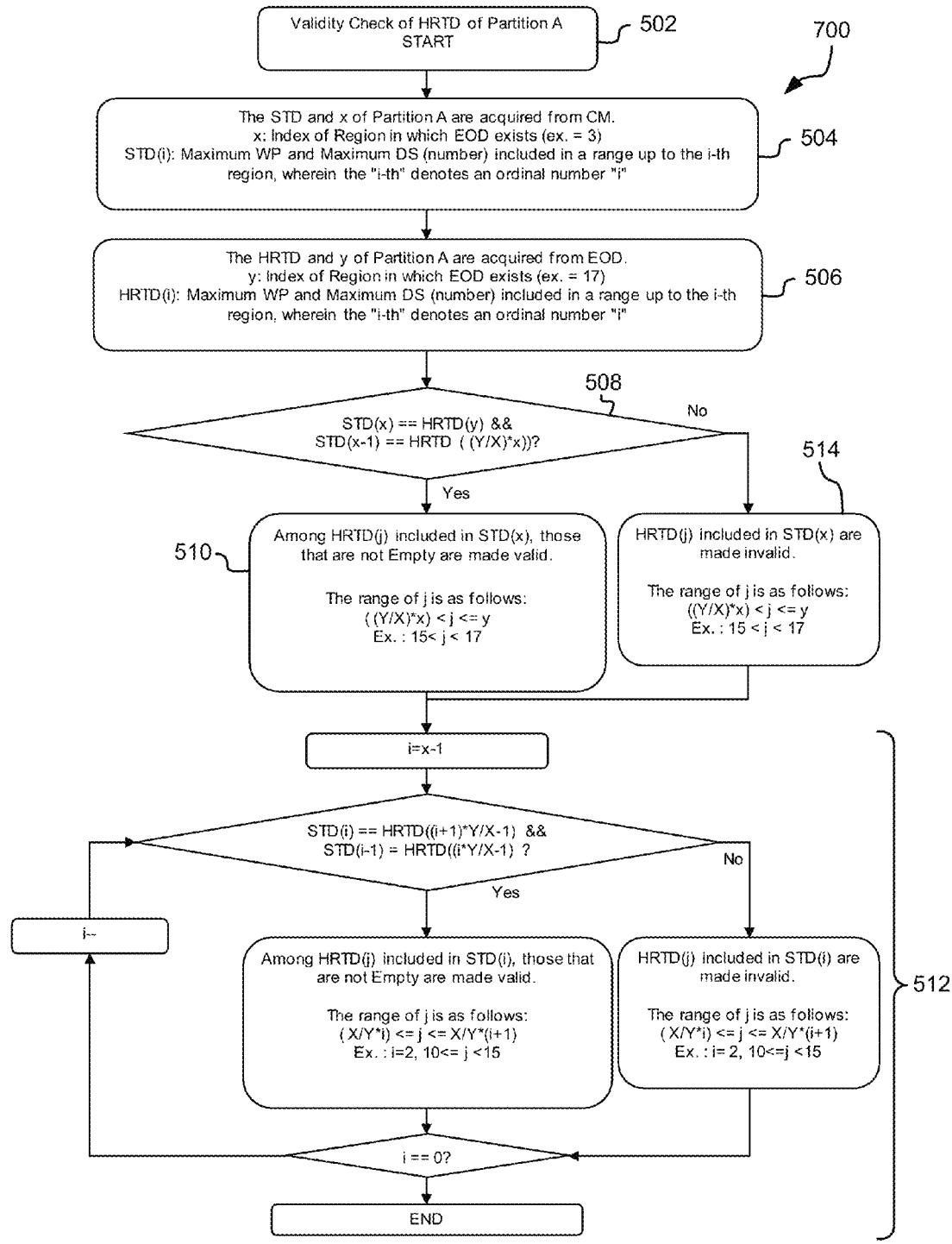
FIG. 7 shows a flowchart of a method, according to one embodiment.

Another description of a method similar to method 500 is provided below, in reference to FIG. 7 and labeled with reference numerals as in FIG. 5, according to one embodiment. Referring again to FIG. 7, in this method 700 for performing a validity check of a partition of a tape, first, it is determined if the normal or standard TD information (STD) that is stored in the CM (typically an 8 KB nonvolatile memory mounted in the cartridge) logically match with HRTD information that is stored in the EOD. It is expected that the HRTD information, which is higher in precision, will be the same as the content of the STD, which is lower in precision. When they are compared with each other on a delimiter-by-delimiter basis, even though they are different from each other in terms of precision, they should match in terms of the positional content they include.

When the HRTD is added to the EOD in an open standard, such as LTO, as a specific function that is unique to a vendor, in some cases, a part of the HRTD is missing; in other cases, the EOD is written by another vendor. For these reasons, the authenticity of the HRTD should be verified by checking whether the HRTD information contained in the EOD matches with the low-precision STD stored in the CM (which is in conformity to the LTO open standard) or not.

In one embodiment, assume that the wrap is divided into a plurality of regions, the number of which is denoted as "X," in STD. Also, assume that the wrap is divided into a plurality of regions, the number of which is denoted as "Y," in the HRTD, where $X \leq Y$. In this example, $X=2$ and $Y=10$. Also, assume that the value of each region may be calculated by using the following functions. STD(i): Maximum WP and Maximum DS (number) included in a range up to the $i^{th}$ region. HRTD (i): Maximum WP and Maximum DS included in a range up to the $i^{th}$ region. In addition, define x and y as follows: x is the STD index of the region (Region) in which the EOD exists (in this example, it is 3), while y is the HRTD index of the region in which the EOD exists (in this example it is 17).

So, for this example, Table 1 shows the values calculated, where the parenthetical numbers are: (DS number, WP).

TABLE 1

| STD | | | 0 | | |
|---|---|---|---|---|---|
| Wrap 0 | | | (1000, 11) | | |
| HRTD | 0 | 1 | 2 | 3 | 4 |
| Wrap 0 | (200, 10) | (400, 10) | (600, 10) | (800, 11) | (1000, 11) |
| STD | | | 1 | | |
| Wrap 0 | | | (2000, 14) | | |
| HRTD | 5 | 6 | 7 | 8 | 9 |
| Wrap 0 | (1200, 12) | (1400, 13) | (1600, 13) | (1800, 14) | (2000, 14) |
| STD | | | 2 | | |
| Wrap 1 | | | (3000, 15) | | |
| HRTD | 10 | 11 | 12 | 13 | 14 |
| Wrap 1 | (2200, 14) | (2400, 15) | (2600, 15) | (2800, 15) | (3000, 15) |
| STD | | | 3 | | |
| Wrap 1 | | | (3555, 20) | | |
| HRTD | 15 | 16 | 17 | 18 | 19 |
| Wrap 1 | (3200, 16) | (3400, 18) | (3555, 20) | | |

As can be seen, using the HRTD, the movement of the tape to the data was performed faster than using the STD information. Accordingly, there is an advantage to using HRTD information to locate data in the data partition.

Figure 6:
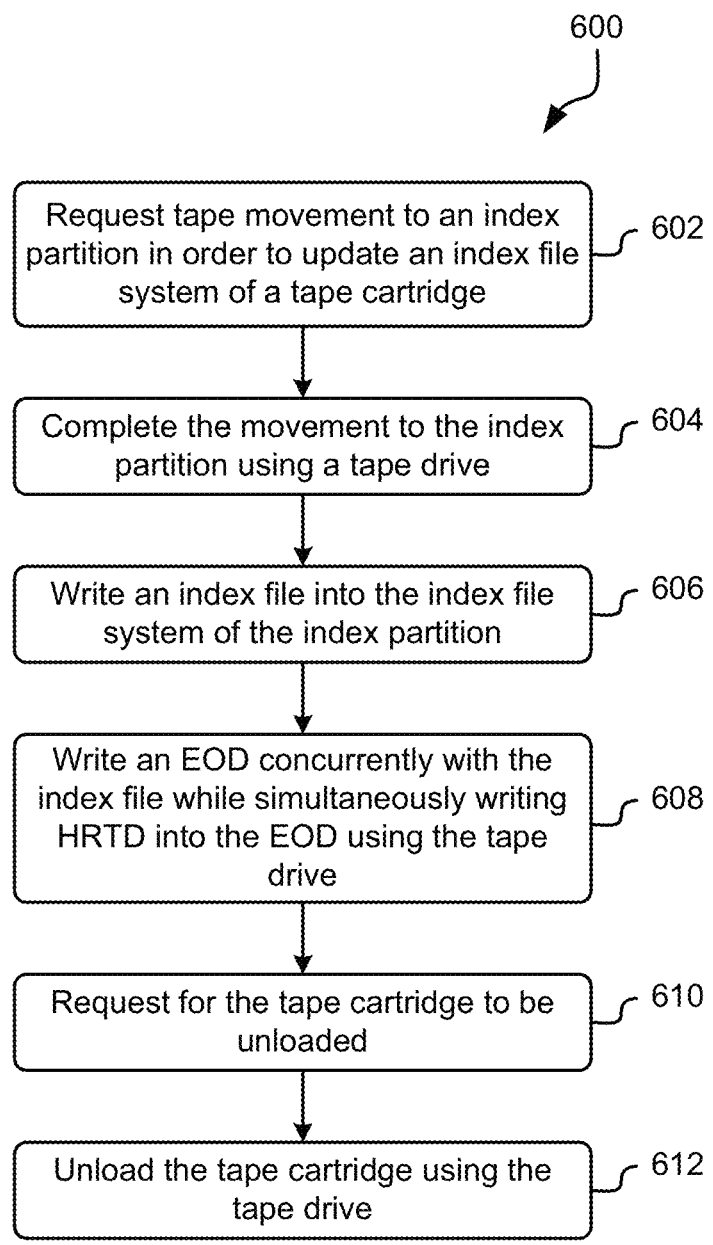
FIG. 6 shows a flowchart of a method, according to one embodiment.

Now referring to FIG. 6, a flowchart of a method 600 for updating an index file is shown, according to one embodiment. The method 600 may be performed in accordance with the present invention in any of the environments depicted in FIGS. 1-3, among others, in various embodiments. This method 600 may be performed just prior to unloading a tape cartridge from a tape drive, in one approach. Of course, more or less operations than those specifically described in FIG. 6 may be included in method 600, as would be understood by one of skill in the art upon reading the present descriptions. Each of the steps of the method 600 may be performed by any suitable component of the operating environment.

As shown in FIG. 6, method 600 may initiate with operation 602, where tape movement is requested to move the tape to an index partition in order to update an index file system of the tape cartridge comprising the tape. This request, in one embodiment, may be initiated by the LTFS.

In operation 604, the tape is moved to the index partition using a tape drive, using any technique known to one of skill in the art.

In operation 606, an index file is written into the index file system of the index partition. This writing may be performed using the LTFS in one embodiment.

In operation 608, an EOD is written concurrently with the index file, while simultaneously writing the HRTD into the EOD. This may be performed using the tape drive, and may be orchestrated using the LTFS.

In operation 610, the tape drive is requested to unload the tape cartridge. This request may originate from the LTFS, and the tape drive may perform the unloading.

In operation 612, the tape cartridge is unloaded using the tape drive, using any technique known to one of skill in the art.

Conventional techniques are now compared with embodiments described herein. The STD which characteristically has a low precision exists in conventional CM. However, unlike an enterprise tape drive, an LTO drive does not offer a function (such as HRTD) for pinpointing a data-read location at a high speed immediately after loading the tape cartridge. Particularly, proposed methods described herein according to various embodiments produce desirable results when used in combination with the LTFS. The HRTD is stored as a part of special data referred to as EOD, the use of which is left to the discretion of each individual vendor, due to the protocol of the LTO format.

By using the embodiments described herein, performance improves when access to a file is made randomly on a LTO tape drive, and in some further embodiments, using LTFS.

According to one embodiment, a tape drive system comprises a file system adapted for enabling sequential access to data on a tape medium, a file access controller adapted for managing the data, the file access controller comprising logic adapted for partitioning the tape medium into two or more partitions, the two or more partitions including at least a data partition and an index partition, logic adapted for writing a file into the data partition of the tape medium, logic adapted for writing a pointer of the written file in the index partition of the tape medium, wherein the pointer is managed by the file access controller, logic adapted for creating a HRTD, the HRTD including detailed location information of data in the data partition of the tape medium, and logic adapted for storing the HRTD as part of EOD of the index partition when a tape cartridge housing the tape medium is unloaded. The file access controller may be any type of controller or processor known in the art suitable for controlling operations of a tape drive system.

According to various embodiments, the tape drive system may adhere to LTO format standards and the file system may adhere to LTFS, the tape drive system may further include logic adapted for receiving, via the file system, a request to read out a specified file, logic adapted for loading a tape cartridge housing a tape medium which includes the specified file stored thereon, logic adapted for reading out a pointer in the index partition to acquire file pointer information corresponding to a location of the specified file, and logic adapted for, concurrent to reading out the pointer from the index partition, reading out the EOD in the index partition in order to acquire the HRTD. In a further approach, logic adapted for determining whether a stored HRTD is valid, logic adapted for validating the acquired HRTD and requesting access to the specified file according to the detailed location information of the HRTD corresponding to the specified file when the stored HRTD is valid, logic adapted for using STD stored in CM to access location information of the specified file when the stored HRTD is invalid, and logic adapted for accessing the specified file at a higher speed when using the HRTD or at a lower speed when using the STD may also be included in the tape drive system.

In even more approaches, the tape drive system may further comprise logic adapted for making changes to data stored in a first portion of the data partition, logic adapted for storing detailed location data for the changed data to EOD of the first portion of the data partition, and logic adapted for reflecting the detailed location data for the changed data in the HRTD stored to the EOD of the index partition when the tape cartridge housing the tape medium is unloaded. In one approach, the logic adapted for storing the HRTD as part of the EOD of the index partition may comprise logic adapted for requesting movement of the tape medium to the index partition in order to update an index file after changes have occurred to data in the data partition, logic adapted for writing an updated index file into the partition index, logic adapted for, concurrent to writing the updated index file, writing an updated HRTD into the EOD of the index partition, and logic adapted for requesting for the tape cartridge to be unloaded.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

In another embodiment, a computer program product for managing detailed location information comprises a computer readable storage medium having computer readable program code embodied therewith. The computer readable program code comprises computer readable program code configured for writing a file into a data partition of a tape medium, wherein the tape medium comprises two or more partitions including the data partition and an index partition, computer readable program code configured for writing a pointer of the written file in the index partition of the tape medium, computer readable program code configured for creating a HRTD, the HRTD including detailed location information of data in the data partition of the tape medium, and computer readable program code configured for storing the HRTD as part of EOD of the index partition when a tape cartridge housing the tape medium is unloaded.

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
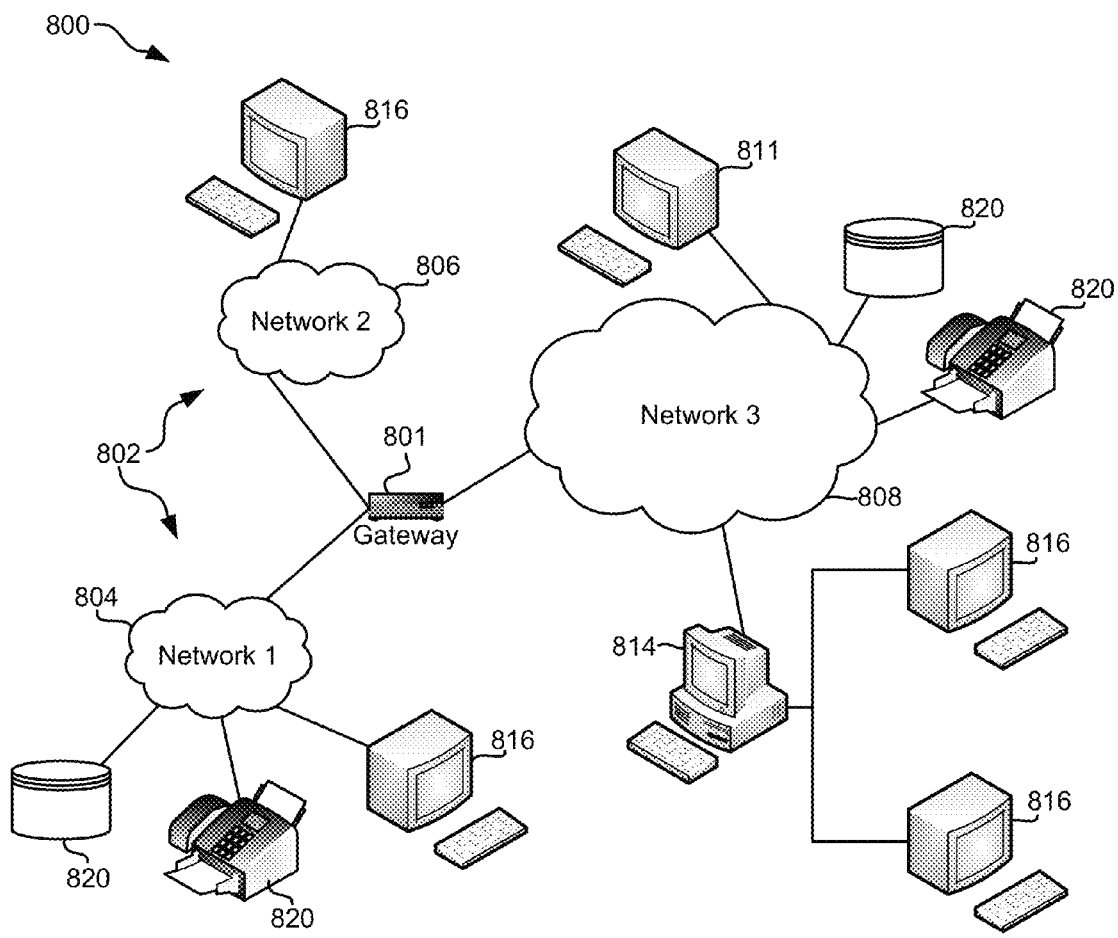
FIG. 8 illustrates a network architecture, in accordance with one embodiment.

FIG. 8 illustrates a network architecture 800, in accordance with one embodiment. As shown in FIG. 8, a plurality of remote networks 802 are provided including a first remote network 804 and a second remote network 806. A gateway 801 may be coupled between the remote networks 802 and a proximate network 808. In the context of the present network architecture 800, the networks 804, 806 may each take any form including, but not limited to a LAN, a WAN such as the Internet, public switched telephone network (PSTN), internal telephone network, etc.

In use, the gateway 801 serves as an entrance point from the remote networks 802 to the proximate network 808. As such, the gateway 801 may function as a router, which is capable of directing a given packet of data that arrives at the gateway 801, and a switch, which furnishes the actual path in and out of the gateway 801 for a given packet.

Further included is at least one data server 814 coupled to the proximate network 808, and which is accessible from the remote networks 802 via the gateway 801. It should be noted that the data server(s) 814 may include any type of computing device/groupware. Coupled to each data server 814 is a plurality of user devices 816. Such user devices 816 may include a desktop computer, laptop computer, handheld computer, printer, and/or any other type of logic-containing device. It should be noted that a user device 811 may also be directly coupled to any of the networks, in some embodiments.

A peripheral 820 or series of peripherals 820, e.g., facsimile machines, printers, scanners, hard disk drives, networked and/or local storage units or systems, etc., may be coupled to one or more of the networks 804, 806, 808. It should be noted that databases and/or additional components may be utilized with, or integrated into, any type of network element coupled to the networks 804, 806, 808. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 804, 806, 808, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 9:
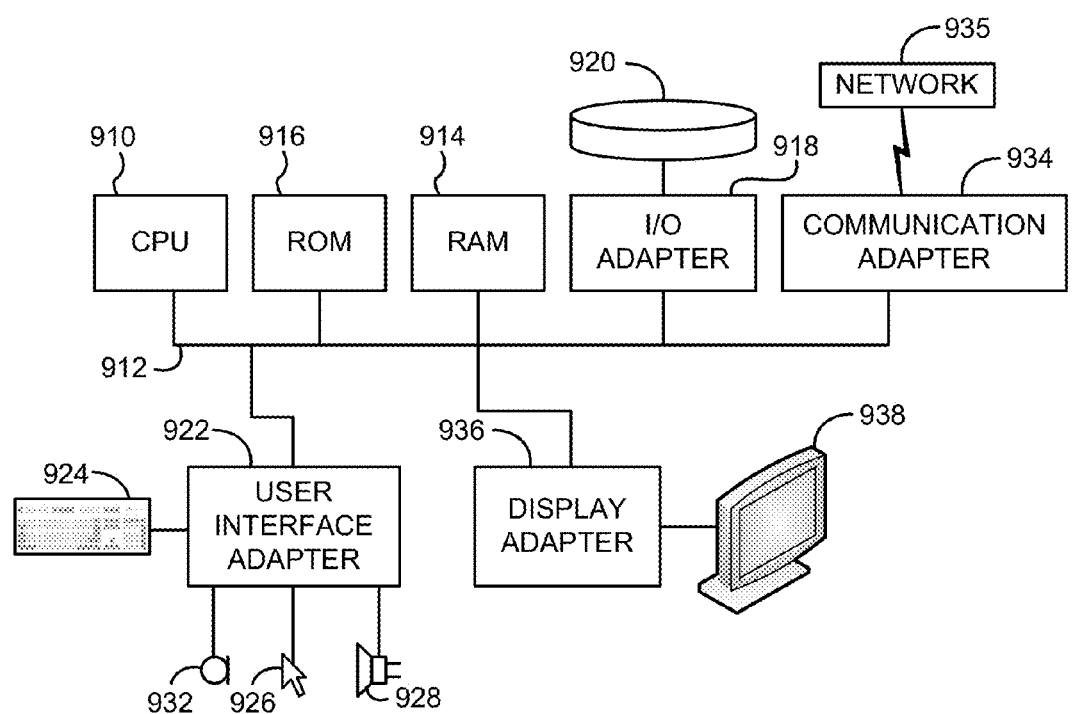
FIG. 9 shows a representative hardware environment that may be associated with the servers and/or clients of FIG. 8, in accordance with one embodiment.

FIG. 9 shows a representative hardware environment associated with a user device 816 and/or server 814 of FIG. 8, in accordance with one embodiment. FIG. 9 illustrates a typical hardware configuration of a workstation having a central processing unit (CPU) 910, such as a microprocessor, and a number of other units interconnected via one or more buses 912 which may be of different types, such as a local bus, a parallel bus, a serial bus, etc., according to several embodiments.

The workstation shown in FIG. 9 includes a Random Access Memory (RAM) 914, Read Only Memory (ROM) 916, an I/O adapter 918 for connecting peripheral devices such as disk storage units 920 to the one or more buses 912, a user interface adapter 922 for connecting a keyboard 924, a mouse 926, a speaker 928, a microphone 932, and/or other user interface devices such as a touch screen, a digital camera (not shown), etc., to the one or more buses 912, communication adapter 934 for connecting the workstation to a communication network 935 (e.g., a data processing network) and a display adapter 936 for connecting the one or more buses 912 to a display device 938.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 10:
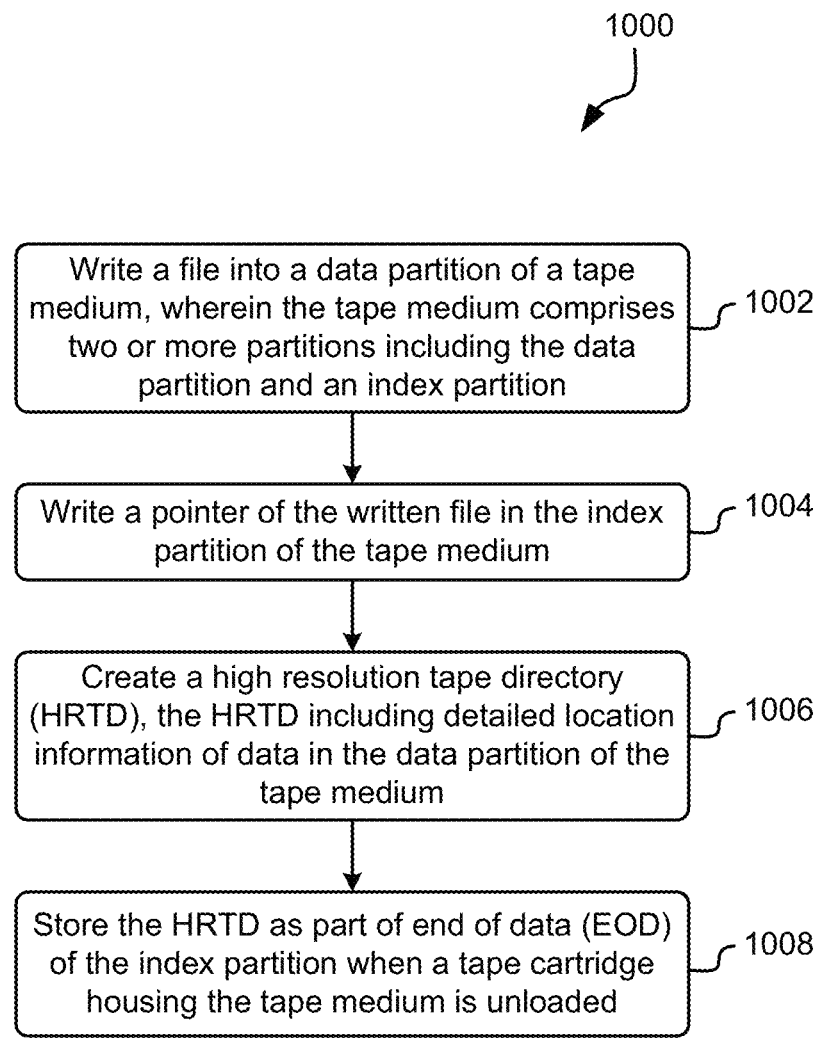
FIG. 10 shows a flowchart of a method, according to one embodiment.

In more approaches, the functionality of the tape drive system described herein may be included in a method or a computer program product. In one such embodiment, referring to FIG. 10, a method 1000 for managing detailed location information is described.

In operation 1002, a file is written into a data partition of a tape medium, wherein the tape medium comprises two or more partitions including the data partition and an index partition. The data may be written using any suitable component of a tape drive system.

In operation 1004, a pointer of the written file is written in the index partition of the tape medium, thereby allowing this written file to be located in subsequent searches.

In operation 1006, a HRTD is created. The HRTD includes detailed location information of data in the data partition of the tape medium, as described herein in more detail.

In operation 1008, the HRTD is stored as part of EOD of the index partition when a tape cartridge housing the tape medium is unloaded, as described herein in more detail.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A tape drive system, comprising:
    a file system configured to enable sequential access to data on a tape medium, the file system being enabled in at least one hardware processor;
    a file access controller configured to manage the data, the file access controller comprising the at least one hardware processor and logic integrated with and/or executable by the at least one hardware processor, the logic being configured to:
    write a file on the tape medium;
    write a pointer of the written file in an index of the tape medium, wherein the pointer is managed by the file access controller;
    create a high resolution tape directory (HRTD), the HRTD including detailed location information of data on the tape medium;
    store the HRTD as part of end of data (EOD) of the index when a tape cartridge housing the tape medium is unloaded;
    receive, via the file system, a request to read out a specified file;
    load the tape cartridge housing the tape medium which includes the specified file stored thereon;
    read out the pointer from the tape medium to acquire directory information corresponding to a location of the specified file;
    read out, concurrent to reading out the pointer, the EOD from the index in order to acquire the HRTD;
    validate the acquired HRTD and request access to the specified file according to the detailed location information of the HRTD corresponding to the specified file in response to a determination that the stored HRTD is valid;
    use a standard tape directory (STD) to access location information of the specified file in response to a determination that the stored HRTD is invalid; and
    access the specified file at a higher speed when using the HRTD or at a lower speed when using the STD.

2. The tape drive system as recited in claim 1, wherein the tape drive system adheres to linear tape open (LTO) format standards, and wherein the file system adheres to linear tape file system (LTFS).

3. The tape drive system as recited in claim 1, wherein the STD is stored in cartridge memory (CM) of the tape cartridge.

4. The tape drive system as recited in claim 1, wherein the logic is configured to:
    determine whether a HRTD stored to an EOD in an index of a tape medium is valid.

5. The tape drive system as recited in claim 1, wherein the logic is configured to:
    make changes to data stored in a first portion of the tape medium;
    store detailed location data for the changed data to EOD of the first portion of the tape medium; and
    reflect the detailed location data for the changed data in the HRTD stored to the EOD of the index when the tape cartridge housing the tape medium is unloaded.

6. The tape drive system as recited in claim 1, wherein the logic configured to store the HRTD as part of the EOD of the index is configured to:
    request movement of the tape medium to the index in order to update the index after changes have occurred to data on the tape medium;
    write an updated index;
    write, concurrent to writing the updated index, an updated HRTD into the EOD of the index: and
    request for the tape cartridge to be unloaded.

7. The tape drive system as recited in claim 1, wherein the logic is configured to partition the tape medium into two or more partitions, the two or more partitions including at least a data partition and an index partition, wherein the index is stored to the index partition, and wherein data is stored to the data partition.

8. A computer-implemented method for managing detailed location information, the method comprising:
    writing a file into a data partition of a tape medium, wherein the tape medium comprises two or more partitions including the data partition and an index partition;
    writing a pointer of the written file in the index partition of the tape medium;
    creating, by a hardware processor, a high resolution tape directory (HRTD), the HRTD including detailed location information of data in the data partition of the tape medium;
    storing, by the hardware processor, the HRTD as part of end of data (EOD) of the index partition when a tape cartridge housing the tape medium is unloaded;
    making changes to data stored in a first portion of the data partition;
    storing detailed location data for the changed data to an EOD of the first portion of the data partition; and reflecting the detailed location data for the changed data in the HRTD stored to the EOD of the index partition when the tape cartridge housing the tape medium is unloaded.

9. The method as recited in claim 8, wherein the tape medium adheres to linear tape open (LTO) format standards, and wherein a linear tape file system (LTFS) enables partitioning of the tape medium.

10. The method as recited in claim 8, further comprising:
receiving a request to read out a specified file;
loading a tape cartridge housing a tape medium which includes the specified file stored thereon;
reading out a pointer in the index partition to acquire directory information corresponding to a location of the specified tile; and
reading out the EOD in the index partition in order to acquire the HRTD concurrent to reading out the pointer from the index partition.

11. The method as recited in claim 10, further comprising:
determining whether a stored HRTD is valid;
validating the acquired FIRM and requesting access to the specified file according to the detailed location information of the HRTD corresponding to the specified file in response to a determination that the stored HRTD is valid;
using standard tape directory (STD) stored in cartridge memory (CM) to access location information of the specified file in response to a determination that the stored HRTD is invalid; and
accessing the specified file at a higher speed when using the HRTD or at a lower speed when using the STD.

12. The method as recited in claim 8, wherein the storing the HRTD as part of the EOD of the index partition comprises:
requesting movement of the tape medium to the index partition in order to update an index file after changes have occurred to data in the data partition;
writing an updated index file into the partition index;
writing an updated HRTD into the EOD of the index partition concurrent to writing the updated index file; and
requesting for the tape cartridge to be unloaded.

13. A computer program product for managing detailed location information, the computer program product comprising a non-transitory computer readable storage medium having computer readable program code embodied therewith, the computer readable program code comprising:
computer readable program code configured for writing a file into a data partition of a tape medium, wherein the tape medium comprises two or more partitions including the data partition and an index partition;
computer readable program code configured for writing a pointer of the written file in the index partition of the tape medium;
computer readable program code configured for creating a high resolution tape directory (HRTD), the HRTD including detailed location information of data in the data partition of the tape medium;
computer readable program code configured for storing the HRTD as part of end of data (EOD) of the index partition when a tape cartridge housing the tape medium is unloaded;
computer readable program code configured for making changes to data stored in a first portion of the data partition;
computer readable program code configured for storing detailed location data for the changed data to an EOD of the first portion of the data partition; and
computer readable program code configured for reflecting the detailed location data for the changed data in the HRTD stored to the EOD of the index partition when the tape cartridge housing the tape medium is unloaded.

14. The computer program product as recited in claim 13, wherein the tape medium adheres to linear tape open (LTO) format standards, and wherein a linear tape file system (LTFS) enables partitioning of the tape medium.

15. The computer program product as recited in claim 13 further comprising:
computer readable program code configured for receiving a request to read out a specified file;
computer readable program code configured for loading a tape cartridge housing a tape medium which includes the specified file stored thereon;
computer readable program code configured for reading out a pointer in the index partition to acquire directory information corresponding to a location of the specified file; and
computer readable program code configured for reading out the EOD in the index partition in order to acquire the HRTD concurrent to reading out the pointer from the index partition.

16. The computer program product as recited in claim 15, further comprising:
computer readable program code configured for determining whether a stored HRTD is valid;
computer readable program code configured for validating the acquired HRTD and requesting access to the specified file according to the detailed location information of the HRTD corresponding to the specified file in response to a determination that the stored HRTD is valid;
computer readable program code configured for using standard tape directory (STD) stored in cartridge memory (CM) to access location information of the specified file in response to a determination that the stored HRTD is invalid; and
computer readable program code configured for accessing the specified file at a higher speed when using the HRTD or at a lower speed when using the STD.

17. The computer program product as recited in claim 13, wherein the computer readable program code configured for storing the HRTD as part of the EOD of the index partition comprises:
computer readable program code configured for requesting movement of the tape medium to the index partition in order to update an index file after changes have occurred to data in the data partition;
computer readable program code configured for writing an updated index file into the partition index;
computer readable program code configured for writing an updated HRTD into the EOD of the index partition concurrent to writing the updated index file; and
computer readable program code configured for requesting for the tape cartridge to be unloaded.

* * * * *